United States Patent
Chung et al.

(10) Patent No.: US 10,163,579 B2
(45) Date of Patent: Dec. 25, 2018

(54) GLASS MATERIALS FOR LARGE SCALE DYE-SENSITIZED SOLAR CELL SEALING AND PASTES COMPRISING THE SAME

(71) Applicants: Kongju National University Industry-University Cooperation Foundation, Gongju-si (KR); Orion Co., Ltd., Gumi-si (KR)

(72) Inventors: Woon Jin Chung, Cheonan-si (KR); Han Sol Lee, Daejeon (KR); Jae Kwun Hwang, Gumi-si (KR); Jae Hyoung Park, Gumi-si (KR)

(73) Assignees: Kongju National University Industry-University Cooperation Foundation, Gongju-si (KR); Orion Co., Ltd., Gumi-si (KR)

( * ) Notice: Subject to any disclaimer, the term of this patent is extended or adjusted under 35 U.S.C. 154(b) by 0 days.

(21) Appl. No.: 15/589,618

(22) Filed: May 8, 2017

(65) Prior Publication Data
US 2018/0033562 A1    Feb. 1, 2018

(30) Foreign Application Priority Data
Jul. 29, 2016    (KR) .................... 10-2016-0097354

(51) Int. Cl.
*C03C 8/08* (2006.01)
*C03C 8/24* (2006.01)
*H01G 9/20* (2006.01)
*C03C 3/066* (2006.01)

(52) U.S. Cl.
CPC .......... *H01G 9/2077* (2013.01); *C03C 3/066* (2013.01); *C03C 8/08* (2013.01); *C03C 8/24* (2013.01); *C03C 2205/00* (2013.01)

(58) Field of Classification Search
CPC ............... C03C 8/04; C03C 8/08; C03C 8/24
See application file for complete search history.

(56) References Cited

U.S. PATENT DOCUMENTS

2014/0328615 A1 * 11/2014 Chaumat .............. B23K 1/0008
                                                      403/272

FOREIGN PATENT DOCUMENTS

| JP | 2000264677 A | * | 9/2000 | ............ C03C 3/064 |
| JP | 2008308393 A | * | 12/2008 | |
| WO | WO-2010131659 A1 | * | 11/2010 | ............ C03C 3/062 |

* cited by examiner

Primary Examiner — Karl E Group
(74) Attorney, Agent, or Firm — Seed IP Law Group LLP

(57) ABSTRACT

Disclosed is a glass composition for sealing a large-area dye-sensitized solar cell, and more particularly, to a glass composition which may be uniformly bonded to a large-area without reacting with an electrolyte.

3 Claims, 1 Drawing Sheet

[Fig. 1A]
[Fig. 1B]
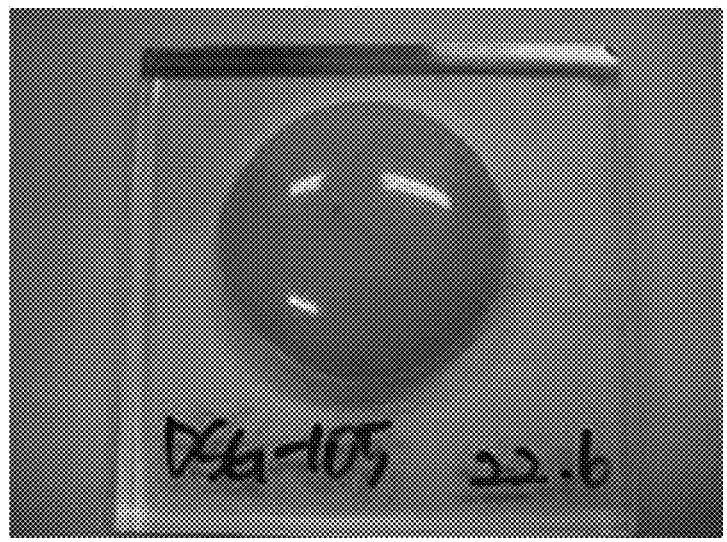

GLASS MATERIALS FOR LARGE SCALE DYE-SENSITIZED SOLAR CELL SEALING AND PASTES COMPRISING THE SAME

CROSS-REFERENCE TO RELATED APPLICATION

This application claims priority to Korean Patent Application No. 10-2016-0097354, filed on Jul. 29, 2016, and all the benefits accruing therefrom under 35 U.S.C. § 119, the contents of which in its entirety are herein incorporated by reference.

BACKGROUND

1. Field

The present disclosure relates to a glass composition for sealing a large-area dye-sensitized solar cell, and more particularly, to a composition for manufacturing a glass material which may be uniformly bonded to a large-area without reacting with an electrolyte.

2. Description of the Related Art

Dye-sensitized solar cells said to be a next-generation solar cell is a future-oriented solar cell used for generating and absorbing electrons by using a glass dye and allowing a long-term service. Recently, as the development of an alternative energy source is accelerated due to the depletion of energy sources, the dye-sensitized solar cells are being actively developed.

Dye-sensitized solar cells use a transparent glass substrate and can freely display various colors according to the type of dye, and can be conveniently fabricated in various sizes, so they are expected to be easily used over a wide range of applications, and are of high use. However, because efficiency is still low at the current level of development, they are not fully used in all possible applications and applied products, and large-area dye-sensitized solar cells are produced on a trial basis and some are being used for interior applications on windows or walls of buildings. Accordingly, the potential for development of dye-sensitized solar cells is high, and in this instance, large-area fabrication and stabilized efficiency of dye-sensitized solar cells are important factors of development.

In addition to a dye, dye-sensitized solar cells use an electrolyte as an electron transport channel, and liquid electrolytes differ in components according to the type of dye. In order to use a liquid electrolyte, a partition wall is needed to prevent an electrolyte from leaking, and Surlyn Film™ of DuPont which is a polymer material is used as a sealing material for a conventional dye-sensitized solar cell. However, Surlyn film has limitations in perfect blocking in the respect that it has low mechanical durability, is difficult to achieve precise bonding because it is of film type, and is prone to react with oxygen or water due to the properties of organics to give possibility of transmission of gas or moisture. Further, for large-area fabrication, precise bonding and high mechanical durability for maintaining adhesion of a large-area substrate are required, but Surlyn film is difficult to satisfy these requirements.

To solve the problem, glass is used as a sealing material to ensure the mechanical durability and allow uniform bonding by a screen printing method using a paste with glass powders, namely frit. Furthermore, formulation capable of minimizing reactivity of glass with an electrolyte is required in order to ensure the chemical durability.

On the other hand, $TiO_2$ is used as an electron transport material of a dye-sensitized solar cell, but $TiO_2$ changes in crystal structure depending on the phase, and in this instance, in the case of phase having the greatest electron transport ability, a phase transition occurs at 550° C. or above, and accordingly, there is a need for glass formulation that can be fired at lower than 550° C.

There are results of studies using, as a sealing material, commercial glasses conventionally used, such as borosilicate or soda-lime, but high process temperature is required, and thus, bonding is not easy. Furthermore, there are instances of using a laser for sealing to replace high process temperature, but precise laser control is difficult, so difficulty in uniform bonding still exists. Moreover, commercial glass formulations have high reactivity with an electrolyte, and are thus released and precipitated, insufficient for sealing.

Many studies have been made to solve the above problems, and glasses with excellent chemical stabilization to an electrolyte have been developed. However, large-sized bonding is difficult due to low adhesive force, and there is also a problem in long-term durability.

SUMMARY

The present disclosure is designed to solve the aforementioned problems, and therefore the present disclosure is directed to providing a glass composition for sealing a large-area dye-sensitized solar cell, which has high chemical stability and mechanical durability.

In one aspect, there is provided a glass composition for sealing a dye-sensitized solar cell, comprising: ($SiO_2$+$Na_2O$+$K_2O$)—$P_2O_5$—ZnO based glass, wherein ($SiO_2$+$Na_2O$+$K_2O$) is present in 10 to 25 mol %, $P_2O_5$ is present in 40 to 60 mol %, and ZnO is present in 5 to 35 mol %, wherein the $P_2O_5$/ZnO has a molar ratio of 1.4 to 1.8, and wherein at least one selected from $ZnF_2$, $BaF_2$ and $CaF_2$ is included to replace a part or all of ZnO.

In addition, the glass composition may further comprise at least one selected from $Al_2O_3$, $B_2O_3$ and $Sb_2O_3$ in an amount more than 0 mol % and less than or equal to 10 mol %, wherein at least one selected from $Al_2O_3$, $B_2O_3$ and $Sb_2O_3$ replaces a part or all of ZnO or $P_2O_5$.

In addition, the glass composition may have a firing temperature of 500° C. or below.

In addition, the glass composition has a firing temperature of 400° C. to 500° C.

In another aspect of the present disclosure, there is provided a paste for sealing a dye-sensitized solar cell, comprising the glass composition; and an organic vehicle.

According to the present disclosure hereinabove provided, effects are expected to uniformly seal dye-sensitized solar cells, ensure chemical stability against the reaction with an electrolyte, and provide a high mechanical strength suitable for large-area bonding, thereby increasing the reliability and lifetime of solar cell products.

Furthermore, glass for sealing a dye-sensitized solar cell according to the present disclosure has the same firing temperature as the firing temperature set when manufacturing unit cells of dye-sensitized solar cells, so there is no need to separately perform a sealing process, thereby simplifying the process, and building a mass production system is expected to be easy.

Furthermore, glass for sealing a dye-sensitized solar cell according to the present disclosure does not need any separate limitation on environment, leading to a wide of selections of process applications. In other words, in a glass fabricating process, in an existing technique, glass may be fabricated under a specific environment or using any melting method other than melt quenching which is frequently used in the art, and this needs to add a specific process. However, the present disclosure may advantageously adopt a most general melting method.

Furthermore, as glass can be fired at 500° C. or less, it is expected to produce the effects in preventing damage in an electrolyte and an electrode and deformation of a substrate that may occur when fabricating dye-sensitized solar cells at high temperature.

BRIEF DESCRIPTION OF THE DRAWINGS

FIG. 1A and FIG. 1B show fluidity test results of $(SiO_2+Na_2O+K_2O)$—$P_2O_5$—ZnO based glass at 500° C. before and after $ZnF_2$, $BaF_2$ and $CaF_2$ are added according to an embodiment of the present disclosure.

DETAILED DESCRIPTION

Hereinafter, the embodiments of the present disclosure are described in detail with reference to the accompanying drawings and diagrams. The embodiments disclosed below are provided for illustrative purposes to give a full understanding of the spirit of the present disclosure to those having ordinary skill in the technical field to which the present disclosure belongs. Therefore, the present disclosure is not limited to the disclosed embodiments and may be embodied in different form.

First, a glass composition for sealing a dye-sensitized solar cell according to an embodiment of the present disclosure is described in detail. Here, a firing temperature means a softening temperature of the glass composition, required for the sealing process.

The glass composition for sealing a dye-sensitized solar cell includes $(SiO_2+Na_2O+K_2O)$—$P_2O_5$—ZnO based glass, the $(SiO_2+Na_2O+K_2O)$—$P_2O_5$—ZnO based glass may include 10 to 25 mol % of $(SiO_2+Na_2O+K_2O)$, 40 to 60 mol % of $P_2O_5$, and 5 to 35 mol % of ZnO, $P_2O_5$ and ZnO may have a molar ratio in the range of 1.4 to 1.8, and $ZnF_2$, $BaF_2$ and $CaF_2$ are included to replace a part or all of ZnO. Here, the glass composition for sealing a dye-sensitized solar cell is not susceptible to crystallization and phase separation, and because alkali elements and transition metals are removed as great as possible in order to minimize reaction with an electrolyte, the glass composition is chemically stable and also physically strong with high bonding strength, and can be fired at the same temperature as the firing temperature of the dye-sensitized solar cell, facilitating the process.

Glass including $SiO_2$ has relatively excellent physical and chemical characteristics in comparison to other kinds of glass but also has a high firing temperature due to the excellent characteristics. Therefore, the glass may not be easily fired at a temperature of 500° C. or below, but by adding $ZnF_2$, $BaF_2$ and $CaF_2$ in a small amount as a substitution, the glass has a firing temperature of 500° C. or below and thus may ensure the same firing temperature as the firing temperature of a solar cell.

In addition, in order to minimize reaction with an electrolyte by improving chemical stabilization, $Al_2O_3$, $B_2O_3$ and $Sb_2O_3$ may be added in a small amount to reinforce the glass network structure further.

The $(SiO_2+Na_2O+K_2O)$—$P_2O_5$—ZnO based glass may have a firing temperature of 500° C. or below.

In the glass composition for sealing a dye-sensitized solar cell, $(SiO_2+Na_2O+K_2O)$ may play roles of a glass network former and an intermediate product simultaneously. $(SiO_2+Na_2O+K_2O)$ may play a role of any one of an intermediate product and a glass network former depending on its amount added, or may also play roles of a glass network former and an intermediate product together. $(SiO_2+Na_2O+K_2O)$ may play a role of weakening or strengthening characteristics of glass as an intermediate product or a glass network former, and its role may be determined by adjusting its ratio.

Therefore, the $(SiO_2+Na_2O+K_2O)$—$P_2O_5$—ZnO based glass according to an embodiment of the present disclosure may include 10 to 25 mol % of $(SiO_2+Na_2O+K_2O)$ on the basis of the entire glass. If the $(SiO_2+Na_2O+K_2O)$—$P_2O_5$—ZnO based glass includes less than 10 mol % of $(SiO_2+Na_2O+K_2O)$, the physical and chemical characteristics of the glass deteriorate and thus its strength or chemical stabilization may not be ensured. If $(SiO_2+Na_2O+K_2O)$ is included in excess of 25 mol %, the physical characteristics are improved, and thus the firing temperature may rise so high not to be easily fired at 500° C. Therefore, $(SiO_2+Na_2O+K_2O)$ has its threshold meaning within the above numerical range.

Meanwhile, in the glass composition for sealing a dye-sensitized solar cell, $P_2O_5$ serves as a network former which forms a network structure, but has a low firing temperature since it is coupled weakly in comparison to other components. In the $(SiO_2+Na_2O+K_2O)$—$P_2O_5$—ZnO based glass, $P_2O_5$ works as a network former which forms a main glass structure two-dimensionally or three-dimensionally, and its coupling is weaker than other components, $P_2O_5$ serves to lower the firing temperature and endow weal physical and chemical durability.

Therefore, the $(SiO_2+Na_2O+K_2O)$—$P_2O_5$—ZnO based glass may include 40 to 60 mol % of $P_2O_5$ on the basis of the entire glass. If the $(SiO_2+Na_2O+K_2O)$—$P_2O_5$—ZnO based glass includes less than 40 mol % of $P_2O_5$, the physical characteristics of the glass are improved to raise the firing temperature, and thus the glass may not be easily fired at 500° C. In addition, if the $(SiO_2+Na_2O+K_2O)$—$P_2O_5$—ZnO based glass includes more than 60 mol % of $P_2O_5$, the glass network structure is weakened and thus physically unstable, and the chemical durability may also be weakened. Therefore, $P_2O_5$ has a threshold meaning within the above numerical range.

Meanwhile, in the glass composition for sealing a dye-sensitized solar cell, ZnO may serve as a network former which forms a network structure, but may also serve as a network modifier which breaks the network structure depending on its ratio. Depending on its ratio, ZnO may perform two roles simultaneously, and thus it is desirable to suitably adjust the ratio of ZnO so that ZnO may serve as a network former and a network modifier together.

The $(SiO_2+Na_2O+K_2O)$—$P_2O_5$—ZnO based glass according to an embodiment of the present disclosure may include 5 to 25 mol % of ZnO. If the $(SiO_2+Na_2O+K_2O)$—$P_2O_5$—ZnO based glass includes less than 5 mol % of ZnO, the firing temperature of the glass may be raised due to a relatively increased fraction of $(SiO_2+Na_2O+K_2O)$. If ZnO is included in excess of 25 mol %, physical and chemical durability may be deteriorated due to a relatively lowered fraction of $(SiO_2+Na_2O+K_2O)$. Therefore, ZnO has a threshold meaning within the above numerical range.

In addition, in the glass composition for sealing a dye-sensitized solar cell according to an embodiment of the present disclosure, $P_2O_5$ and ZnO have a molar ratio of 1.4 to 1.8. If the molar ratio of $P_2O_5$ and ZnO is lower than 1.4, the glass formation deteriorates due to crystallization or phase separation, and if the molar ratio is greater than 1.8, fluidity is lowered. Therefore, the molar ratio of $P_2O_5$ and ZnO has a threshold meaning within the above numerical range.

In the glass composition for sealing a dye-sensitized solar cell according to an embodiment of the present disclosure, at least one of $ZnF_2$, $BaF_2$ and $CaF_2$ may be included to replace part or all of ZnO in the $(SiO_2+Na_2O+K_2O)$—$P_2O_5$—ZnO based glass.

$ZnF_2$, $BaF_2$, and $CaF_2$ weakens a network structure in the glass, and thus physical and chemical characteristics are somewhat deteriorated, but the glass transition temperature is greatly lowered to have a firing temperature of 500° C. or below. If at least one selected from $ZnF_2$, $BaF_2$, and $CaF_2$ is included in excess of the amount of ZnO, the characteristics of the glass may be seriously lowered to deteriorate stability of the material.

In addition, the glass composition for sealing a dye-sensitized solar cell may further include at least one of $Al_2O_3$, $B_2O_3$ and $Sb_2O_3$ in an amount of 0 to 10 mol % in addition to the $(SiO_2+Na_2O+K_2O)$—$P_2O_5$—ZnO based glass, and they may be included to replace ZnO or $P_2O_5$.

$Al_2O_3$, $B_2O_3$ and $Sb_2O_3$ may play a role of reinforcing the network structure in the $(SiO_2+Na_2O+K_2O)$—$P_2O_5$—ZnO based glass to improve adhesive force and chemical and physical stability. If $Al_2O_3$, $B_2O_3$ and $Sb_2O_3$ are included in excess of 10 mol %, the physical characteristics may become stronger to rise the firing temperature, and this may cause crystallization and phase separation of the glass.

Meanwhile, the glass composition for sealing a dye-sensitized solar cell according to an embodiment of the present disclosure may not further include an additional transition metal such as Cr, Fe, Co, Ni, Mo and Bi. The transition metal may cause release or precipitation due to the reaction with an electrolyte in the dye-sensitized solar cell, which may deteriorate durability of the glass for sealing a dye-sensitized solar cell.

The sealing of the dye-sensitized solar cell bonds two substrates and blocks the electrolyte used to contact with air, water and other contaminants. A conventional sealing material includes a synthesized polymer material, for example, Surlyn film, and the film achieves stable bonding and sealing in a single cell, but as areas become larger, the bonding strength becomes lower and a process for uniform bonding is unfavorable, and a contact surface with oxygen or moisture increases and a reaction with an electrolyte increases, making it difficult to use. Accordingly, the use of appropriate glass for sealing a large-area dye-sensitized solar cell as a sealing material can compensate for the poor mechanical durability that may occur when Surlyn film is used as above, and besides, ensure the chemical and thermal durability.

This glass composition can be used as a material for sealing a dye-sensitized solar cell, together with an organic vehicle.

Hereinafter, a glass manufacturing method according to another embodiment of the present disclosure is described in detail.

The glass manufacturing method according to another embodiment of the present disclosure includes mixing 10 to 25 mol % of $(SiO_2+Na_2O+K_2O)$, 40 to 60 mol % of $P_2O_5$ and 5 to 35 mol % of ZnO with an organic vehicle and firing at a predetermined firing temperature.

The firing includes, but not limited to, molding the glass and the vehicle by heating, and for example, may be performed by processes including a screen printing process. Also, besides the above method, the firing may be also performed by various methods. Subsequently, the molded glass and vehicle are heated at the predetermined firing temperature so they are melted by heating and molded, and then cooled to complete a sealing process.

As the glass does not include alkali elements and additional transition metals such as Cr, Fe, Co, Ni, Mo or Bi, reactable factors of the glass with an electrolyte are obviated as much as possible. Thereby release and precipitation reactions are impeded, ensuring high chemical and mechanical stability.

When $Al_2O_3$, $B_2O_3$ and $Sb_2O_3$ are further added to the glass composition of the present disclosure or $Al_2O_3$, $B_2O_3$ and $Sb_2O_3$ are included therein to replace a part or all of ZnO or $P_2O_5$, the glass phase may be stabilized. Therefore, as $Al_2O_3$, $B_2O_3$ and $Sb_2O_3$ are further included in the $(SiO_2+Na_2O+K_2O)$—$P_2O_5$—ZnO based glass, the process applicability can be improved.

Hereinafter, specific examples according to the present disclosure are described in detail with reference to the drawings.

EXAMPLE $(SiO_2+Na_2O+K_2O)$—$P_2O_5$—ZnO based glass is weighed for each sample by the formulation as shown in Table 1 below.

TABLE 1

Unit: mol %

| Glass sample | $SiO_2$ | $Na_2O$ | $K_2O$ | $P_2O_5$ | ZnO | $B_2O_3$ | $Al_2O_3$ | BaF | ZnF | Firing results | Note | P/Zn |
|---|---|---|---|---|---|---|---|---|---|---|---|---|
| 1 | 5 | 10 | 5 | 40 | 40 | 5 | 3 | 0 | 0 | ○ | | 1 |
| 2 | 5 | 10 | 5 | 38 | 35 | 5 | 5 | 0 | 0 | ○ | | 1.08 |
| 3 | 5 | 10 | 5 | 40 | 33 | 5 | 5 | 0 | 0 | ○ | excellent fluidity | 1.21 |
| 4 | 5 | 15 | 0 | 38 | 35 | 5 | 5 | 0 | 0 | ○ | | 1.08 |
| 5 | 5 | 15 | 0 | 40 | 33 | 5 | 5 | 0 | 0 | ○ | | 1.21 |
| 6 | 5 | 10 | 5 | 50 | 20 | 5 | 5 | 0 | 0 | ○ | | 2.5 |
| 7 | 5 | 10 | 5 | 47.5 | 22.5 | 5 | 5 | 0 | 0 | ○ | | 2.11 |
| 8 | 5 | 10 | 5 | 45 | 25 | 5 | 5 | 0 | 0 | ○ | excellent fluidity | 1.8 |
| 9 | 5 | 10 | 5 | 42.5 | 27.5 | 5 | 5 | 0 | 0 | ○ | excellent fluidity | 1.55 |
| 10 | 5 | 10 | 5 | 40 | 30 | 5 | 5 | 0 | 0 | ○ | | 1.33 |
| 11 | 5 | 10 | 5 | 37.5 | 32.5 | 5 | 5 | 0 | 0 | X | crystallization | 1.15 |
| 12 | 5 | 10 | 5 | 35 | 35 | 5 | 5 | 0 | 0 | X | crystallization | 1 |
| 13 | 5 | 10 | 5 | 32.5 | 37.5 | 5 | 5 | 0 | 0 | X | crystallization | 0.87 |
| 14 | 5 | 10 | 5 | 42.5 | 22.5 | 5 | 5 | 5 | 0 | ○ | | 1.89 |

TABLE 1-continued

Unit: mol %

| Glass sample | SiO$_2$ | Na$_2$O | K$_2$O | P$_2$O$_5$ | ZnO | B$_2$O$_3$ | Al$_2$O$_3$ | BaF | ZnF | Firing results | Note | P/Zn |
|---|---|---|---|---|---|---|---|---|---|---|---|---|
| 15 | 5 | 10 | 5 | 42.5 | 17.5 | 5 | 5 | 10 | 0 | ○ | | 2.43 |
| 16 | 5 | 10 | 5 | 42.5 | 12.5 | 5 | 5 | 15 | 0 | X | crystallization | 3.4 |
| 17 | 5 | 10 | 5 | 42.5 | 7.5 | 5 | 5 | 20 | 0 | X | crystallization | 5.67 |
| 18 | 5 | 10 | 5 | 42.5 | 22.5 | 5 | 5 | 0 | 5 | ○ | | 1.55 |
| 19 | 5 | 10 | 5 | 42.5 | 17.5 | 5 | 5 | 0 | 10 | ○ | excellent fluidity | 1.55 |
| 20 | 5 | 10 | 5 | 42.5 | 12.5 | 5 | 5 | 0 | 15 | ○ | excellent fluidity | 1.55 |
| 21 | 5 | 10 | 5 | 42.5 | 7.5 | 5 | 5 | 0 | 20 | ○ | excellent fluidity | 1.55 |

The glass samples Nos. 1 to 21 were melted for 1 hour by heating in the air at 1300° C. using an electric furnace, and then quenched to manufacture glass. As a result, as shown in Table 1, all of the glass samples including (SiO$_2$+Na$_2$O+K$_2$O) were melted.

Subsequently, each of the glass samples Nos. 1 to 21 was processed into powder of 50 μm or less, which was compression-molded using a mold with a diameter of 12 mm and fired at 500° C. for 30 minutes.

As a result, as shown in Table 1, when 5 to 25 mol % of (SiO$_2$+Na$_2$O+K$_2$O), 40 to 60 mol % of P$_2$O$_5$ and 5 to 35 mol % of ZnO are included, the compositions where ZnF$_2$, BaF$_2$ and CaF$_2$ are included to replace a part of ZnO, where Al$_2$O$_3$ and B$_2$O$_3$ are respectively further included in an amount of 5 mol % or less, or where P$_2$O$_5$ and ZnO have a molar ratio in the range of 1.4 to 1.8 were excellent in fluidity.

As a result, as shown in FIG. 1A and FIG. 1B, it was increased from 18.2 mm to 22.6 mm.

This is a result obtained by a flow button test and represents fluidity at a corresponding temperature. In detail, the test is an experimental method where after a glass sample is compression-molded into 12 mm and then fired, a flowed diameter is measured again to check the degree of fluidity.

A sealing glass composition with excellent fluidity means a glass composition which does not cause crystallization, is easy to melt for the preparation of a glass composition, and allows easy softening or melting at a firing temperature to ensure smooth processing.

Conventional glass materials react with an electrolyte after being sealed, so that some components are released or precipitated, thereby causing a leakage of an electrolyte and thus damaging the electrode.

In order to check chemical stabilization, the fired glass material was immersed in an electrolyte and sealed, and then a reaction of the electrolyte and the glass was checked under a severe condition where the glass was maintained for 72 hours at 85° C. which is a highest operation temperature of a solar cell. As a result, the glass had no special apparent reaction and no crystallization and maintained its gloss, different from existing glasses. Since release, precipitation or crystallization was not generated under a severe condition, it was checked that the glass of the subject invention had more excellent chemical stabilization in comparison to existing glass materials.

The description hereinabove provided has described the technical spirit of the present disclosure for illustrative purposes only, and various modifications, changes and substitutions can be made by those skilled in the art without departing from the nature of the present disclosure. Accordingly, the embodiments disclosed herein are provided to describe, but not intended to limit the technical spirit of the present disclosure, and the scope of the technical spirit of the present disclosure is not limited by these embodiments. The scope of protection of the present disclosure should be interpreted by the appended claims, and the full technical spirit within the scope in equivalence thereto shall be interpreted as being included in the scope of protection of the present disclosure.

What is claimed is:

1. A glass composition for sealing a dye-sensitized solar cell, comprising:
    (SiO$_2$+Na$_2$O+K$_2$O)—P$_2$O$_5$—ZnO based glass,
    wherein (SiO$_2$+Na$_2$O+K$_2$O) is present in 10 to 25 mol %, P$_2$O$_5$ is present in 40 to 60 mol %, and ZnO is present in 5 to 35 mol %,
    wherein the composition further comprises: B$_2$O$_3$ in an amount more than 0 mol % and less than or equal to 5 mol %; Al$_2$O$_3$ in an amount more than 0 mol % and less than or equal to 5 mol %, and ZnF$_2$ in an amount more than 0 mol % and less than or equal to 20 mol %, and
    wherein the composition excludes any element selected from the group consisting of Cr, Fe, Co, Ni, Mo and Bi.

2. The glass composition for sealing a dye-sensitized solar cell according to claim 1,
    wherein the glass composition has a softening temperature of 500° C. or below.

3. A paste for sealing a dye-sensitized solar cell, comprising: the glass composition according to claim 1; and an organic vehicle.

* * * * *